United States Patent
Smolen et al.

(10) Patent No.: US 12,271,444 B2
(45) Date of Patent: Apr. 8, 2025

(54) SYSTEM AND METHOD TO INDEMNIFY ARTIFICIAL INTELLIGENCE ON A BLOCKCHAIN

(71) Applicant: Quotidian Engineering and Development Corp, Lewes, DE (US)

(72) Inventors: Christopher M. Smolen, Oneida, NY (US); Stuart W. Card, Newport, NY (US); Robert C. Anderson, Glenmont, NY (US)

(73) Assignee: Quotidian Engineering and Development Corp., Lewes, DE (US)

( * ) Notice: Subject to any disclaimer, the term of this patent is extended or adjusted under 35 U.S.C. 154(b) by 206 days.

(21) Appl. No.: 18/049,438

(22) Filed: Oct. 25, 2022

(65) Prior Publication Data
US 2023/0135632 A1   May 4, 2023

Related U.S. Application Data

(60) Provisional application No. 63/263,199, filed on Oct. 28, 2021.

(51) Int. Cl.
| | |
|---|---|
| H04L 29/06 | (2006.01) |
| G06F 18/21 | (2023.01) |
| H04L 9/00 | (2022.01) |
| H04L 9/32 | (2006.01) |

(52) U.S. Cl.
CPC .......... *G06F 18/217* (2023.01); *H04L 9/3236* (2013.01); *H04L 9/50* (2022.05)

(58) Field of Classification Search
CPC ....... G06F 18/217; H04L 9/3236; H04L 9/50; H04L 2209/56
See application file for complete search history.

(56) References Cited

U.S. PATENT DOCUMENTS

| | | | |
|---|---|---|---|
| 10,991,463 B2* | 4/2021 | Kutzko | H04L 9/3239 |
| 11,017,321 B1* | 5/2021 | Mishra | G05B 23/0283 |
| 11,132,993 B1* | 9/2021 | McDaniel | G10L 15/1807 |

(Continued)

OTHER PUBLICATIONS

Yang et al., "Re-examining Whether, Why, and How Human-AI Interaction Is Uniquely Difficult to Design", CHI '20: Proceedings of the 2020 CHI Conference on Human Factors in Computing Systems, pp. 1-13, Apr. 23, 2020.*

*Primary Examiner* — Morshed Mehedi
(74) *Attorney, Agent, or Firm* — HOFFMAN WARNICK LLC

(57) ABSTRACT

Embodiments of the disclosure provide methods and systems for evaluating and recording a property of a system of interest (SOI) such as, e.g., a property of artificial intelligence (AI), and recording a change to the property of the SOI, e.g., recording a morphism of AI. Recording an SOI property, and any property changes, may include recording a digital property of the SOI to a blockchain. An SOI morphism may be recorded to a blockchain as one or more hash values of an encoding of the SOI. An SOI morphism may be autonomously or exogenously generated and recorded to the blockchain. The records on the blockchain may indemnify one or more parties associated with the SOI. Indemnifying may include executing a smart contract on a blockchain to mitigate risk of loss. An SOI may be asked to complete one or more tests to distinguish between a human, AI, and non-AI programs.

12 Claims, 13 Drawing Sheets

(56) References Cited

U.S. PATENT DOCUMENTS

| | | | |
|---|---|---|---|
| 11,934,969 B2* | 3/2024 | McNeil | G06N 20/00 |
| 2017/0099200 A1* | 4/2017 | Ellenbogen | G06V 10/764 |
| 2017/0178528 A1* | 6/2017 | Mayfield | G06F 40/253 |
| 2017/0337373 A1* | 11/2017 | Conti | G06F 21/55 |
| 2018/0344242 A1* | 12/2018 | Ben-Kiki | A61B 5/7425 |
| 2020/0250076 A1* | 8/2020 | Yu | G06F 11/3664 |
| 2020/0401503 A1* | 12/2020 | Gao | G06F 11/3672 |
| 2021/0152496 A1* | 5/2021 | Kim | H04L 51/02 |
| 2021/0287459 A1* | 9/2021 | Cella | G07C 5/0808 |
| 2021/0314269 A1* | 10/2021 | Stewart | H04L 63/1425 |
| 2021/0334563 A1* | 10/2021 | Artuso | G07C 5/085 |
| 2021/0342545 A1* | 11/2021 | Avshalomov | G06F 16/248 |

* cited by examiner

SYSTEM AND METHOD TO INDEMNIFY ARTIFICIAL INTELLIGENCE ON A BLOCKCHAIN

CROSS-REFERENCE TO RELATED APPLICATIONS

This application claims priority to U.S. provisional application No. 63/263,199, filed on Oct. 28, 2021.

TECHNICAL FIELD

The disclosure relates generally to blockchains, and more particularly to systems and methods for recording properties of artificial intelligence and other systems of interest and changes in properties, inter alia, to support indemnification of one or more parties.

BACKGROUND

A "blockchain" is a growing list of records (e.g., "blocks") that are linked together using cryptography on a distributed ledger. Specific blockchain protocols may vary between blockchains. In some blockchains, for example, each block contains a cryptographic hash of the previous block, a timestamp or sequence number, and transaction or other revision, modifications, or updated data. Each block may contain information about previous blocks, forming a chain of blocks such that each additional block reinforces previous blocks to form a modification resistant blockchain. Data in any given block cannot be altered retroactively without altering subsequent blocks. Blockchain functionality has progressed to include, inter alia, smart contracts and token creation (e.g., ERC-20 tokens) on existing blockchains (e.g., Ethereum blockchain).

A "smart contract" is a program stored on a blockchain that executes when predetermined conditions are met. Smart contracts are typically used to automate the execution of an agreement so that all participants can be immediately certain of the outcome, without any intermediary's involvement or time loss. Smart contracts may also automate a workflow, triggering subsequent actions when conditions are met. After a smart contract executes an action (e.g., releasing funds to appropriate parties), the blockchain is then updated when the transaction is completed. A "smart contract bounty" is an offer to blockchain programmers to detect and/or correct technical problems associated with a respective smart contract's execution on the blockchain. A blockchain programmer is often rewarded with a digital token of value (e.g., cryptocurrency) for detecting and/or correcting technical problems associated with a respective smart contract.

A Turing Test measures a machine's ability to exhibit intelligent behavior equivalent to, or indistinguishable from, that of a human. Turing Tests are often used online to verify that a user of a computer program (e.g., a website, etc.) is in fact human and not a machine configured to engage the website (e.g., a "bot"). The term "bot" may generally refer to computer algorithms or functions designed for specific tasks; a typical bot cannot learn and is readily identified by a Turing Test. The term "artificial intelligence" (herein referred to as "AI") may generally refer to a system that perceives its environment and takes actions that maximize its chance of achieving its goals. As artificial intelligence sophistication continues to increase, there exists a need to readily distinguish artificial intelligence entities from humans and bots.

SUMMARY

The illustrative aspects of the present disclosure are designed to solve the problems herein described and/or other problems not discussed.

An aspect of the disclosure provides a method for classifying a system of interest (SOI) as human, artificial intelligence (AI), or non-AI software, the method including: administering a set of tests to the SOI; calculating a result of the set of tests; and characterizing the SOI as one of human, AI, or non-AI software, based on the calculated result.

Another aspect of the disclosure includes any of the preceding aspects, and a method for classifying a system of interest (SOI) as human, artificial intelligence (AI), or non-AI software, the method including: administering a first test configured to determine whether the SOI has a human ability; and administering a second test configured to determine whether the SOI has a software ability. Administering the first test may include administering a Turing Test. Administering the first test may include one or more language tests, including: speech recognition, part of speech tagging, word sense disambiguation, named entity recognition, co-reference resolution, sentiment analysis, or natural language generation. Administering the second test may include one or more math computation tests, including: recursive math calculations, calculus, and linear algebra. The method may include selecting a first test from a plurality of language tests; and selecting a second test from a plurality of math computation tests; and displaying the first test and the second test on a graphical user interface (GUI) to the SOI. The method may further include calculating a result of a set of tests by determining whether the SOI has a human ability and a software ability; and characterizing the SOI as AI if the calculated result indicates the SOI has the human ability and the software ability.

Another aspect of the disclosure provides any of the preceding aspects, and a method, including: executing a cryptographic hash function (CHF) on a first encoding of a system of interest (SOI) at a first time to yield a first hash value; recording the first hash value to a blockchain; executing the CHF on a second encoding of the SOI at a second time to yield a second hash value; and recording the second hash value to the blockchain.

In another aspect of the disclosure that provides any of the preceding aspects, and where the first encoding of the SOI includes source code and learned information of the SOI at the first time; and the second encoding includes source code and learned information of the SOI at the second time.

Another aspect of the disclosure provides any of the preceding aspects, and a method, including: evaluating a property of the SOI at the first time and the second time; comparing the property at the first time to the property at the second time to determine whether the SOI at the second time is a morphism of the SOI at the first time; recording an attestation of the property to the blockchain; and executing a smart contract on the blockchain to indemnify a party associated with the SOI. Recording the attestation may include generating a statement having a cryptographic signature with an attestor private key that is recorded to the blockchain.

Another aspect of the disclosure includes any of the preceding aspects, and a system for classifying a system of interest (SOI) as human, artificial intelligence (AI), or non-AI software, the system including: a memory; and a processor coupled to the memory and configured to perform actions. The actions including: administering a set of tests to the SOI; calculating a result of the set of tests; and characterizing the SOI as one of human, AI, or non-AI software, based on the calculated result.

Another aspect of the disclosure includes any of the preceding aspects, and a system for classifying a system of interest (SOI) as human, artificial intelligence (AI), or non-AI software, the system including: a memory; and a processor coupled to the memory and configured to perform actions. The actions including: administering a first test configured to determine whether the SOI has a human ability; and administering a second test configured to determine whether the SOI has a software ability. Administering the first test may include administering a Turing Test. Administering the first test may include one or more language tests, including: speech recognition, part of speech tagging, word sense disambiguation, named entity recognition, co-reference resolution, sentiment analysis, or natural language generation. Administering the second test may include one or more math computation tests, including: recursive math calculations, calculus, and linear algebra. The method may include selecting a first test from a plurality of language tests; and selecting a second test from a plurality of math computation tests; and displaying the first test and the second test on a graphical user interface (GUI) to the SOI. The actions may further include calculating a result of a set of tests by determining whether the SOI has a human ability and a software ability; and characterizing the SOI as AI if the calculated result indicates the SOI has the human ability and the software ability.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF DRAWINGS

These and other features of this disclosure will be more readily understood from the following detailed description of the various aspects of the disclosure taken in conjunction with the accompanying drawings that depict various embodiments of the disclosure, in which.

Figure 1:
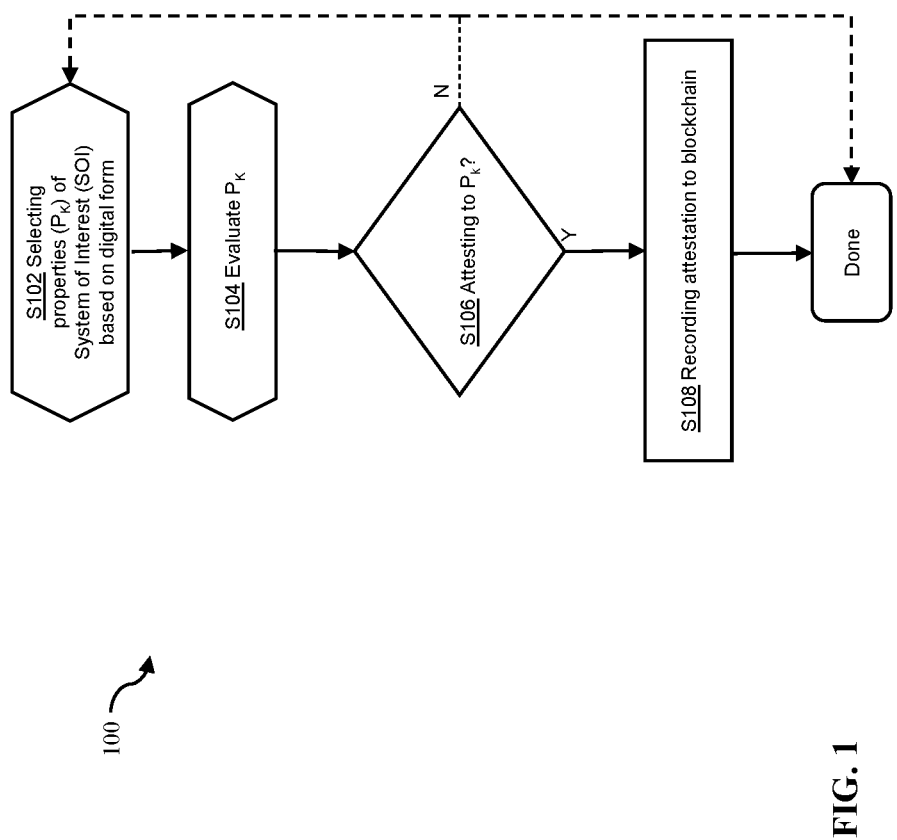
FIG. 1 shows an illustrative flow diagram for implementing a methodology to attest to a system of interest on a blockchain according to the disclosure.

The drawings are intended to depict only typical aspects of the disclosure, and therefore should not be considered as limiting the scope of the disclosure.

DETAILED DESCRIPTION

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the disclosure and the practical application, and to enable others of ordinary skill in the art to understand the disclosure for various embodiments with various modifications as are suited to the particular use contemplated.

Embodiments of the disclosure provide a method, system, and program product for classifying a system of interest as artificial intelligence, recording the system of interest to a distributed ledger, and executing a smart contract on the distributed ledger for indemnification. Methods according to the disclosure may include, e.g., immutably recording one or more morphisms of an artificial intelligence to a distributed ledger (e.g., a blockchain). A "morphism" may include a variation or mutation of a respective AI, as well as a different representation of an otherwise equivalent AI.

In some cases, the methodology may include classifying a system of interest as artificial intelligence. A system of interest ("SOP") may include an entity with properties ("$P_K$") amenable to description in digital forms such as, e.g., an artificial intelligence or software program having digital properties. The entity type of the SOI may not be initially known, and methods according to the disclosure may classify the SOI as having (or not having) artificial intelligence. Classifying the SOI may include administering one or more tests configured to distinguish between humans, artificial intelligence, and non-AI software programs.

The disclosure also may include indemnifying an AI to mitigate a risk of loss resulting from the use of, or an action taken by, the AI. The method may include indemnifying a party that creates, owns, or otherwise has rights to, the AI and/or the AI morphisms. The method may include indemnifying one or more morphisms in use, or proposed for use, which are immutably recorded on a blockchain. Indemnifying AI may further include adding an indemnified AI morphism to a pool consisting of one or more other indemnified AI morphisms to mitigate risk of loss.

In some implementations, the disclosure provides recording one or more AI morphisms to one or more blockchains. Recording AI morphisms may include writing every variation of a respective AI to a blockchain. The method may include recording a chain of AI ownership, revisions to the AI, interactions with the AI, etc. Recording AI morphisms may include executing a cryptographic hash function to yield a hash value and writing the hash value to one or more blockchains. A "cryptographic hash function" ("CHF") is a standard tool of cryptography that includes a mathematical algorithm (e.g., SHA-256) that maps data of an arbitrary size (e.g., a "message") to a bit array of a fixed size (e.g., the "hash value," or "hash"). A CHF is a one-way function, meaning that the function is infeasible to invert or reverse the computation. Any change to a message input modifies the hash value output such that a new hash value appears uncorrelated with the old hash value.

Methods of the disclosure may provide features for establishing rights for AI such as, e.g., one or more terms by which a smart contract operates, or the right to propagate and mutate unmolested. For instance, a smart contract on the blockchain may operate using a token (e.g., ERC-20 token) to execute the smart contract or provide a store of value. The "right to propagate and mutate unmolested" may include enabling an AI entity, and one or more morphisms of the AI entity, to continue being recorded on the blockchain in future transactions. An AI entity may be permitted to autonomously create a mutation of the AI entity and propagate the mutation by recording a CHF of the mutation to the blockchain. The method may include executing one or more smart contracts on the blockchain to indemnify a third party from an event resulting from one or more morphisms.

Methods according to the disclosure also may include, e.g., implementing a payment layer to facilitate execution of one or more smart contracts between two or more parties — such as, e.g., machine to machine ("M2M"), artificial intelligence to human ("AI2H"), human to machine ("H2M"), etc. The method may include providing a smart contract bounty (e.g., "Web3 bounties") to incentivize a third-party to develop or implement a respective smart contract.

Methods according to the disclosure may further include, e.g., interacting with an artificial intelligence on a blockchain through an Application Program Interface ("API"). The API may be configured to include one or more of the following: (i) revision identifier; (ii) changes to artificial intelligence source code; (iii) Frame Problem references; (iv) indemnification algorithms; (v) open source and onboarding protocols; and (vi) a motivation medium (e.g., fungible token, ERC-20 token).

In some embodiments, a method of the disclosure may include selecting one or more parties to join a permissioned immutable blockchain ledger and the selected party(ies) executing a smart contract on the blockchain. The selected party(ies) (e.g., a "smart contract party") may include, inter alia, one or more of the following: a manufacturer (e.g., car manufacturer), an insurance company (e.g., car insurance company), a computer programming sub-contractor (e.g., car software programmer), an end user (e.g., driver of car), a rental company (e.g., car rental company), etc. A smart contract party may execute a smart contract written on a blockchain capable Turing-complete virtual machine—such as, e.g., Ethereum. A smart contract party may be an indemnitor that writes a policy to cover equipment incorporating morphisms—e.g., an indemnitor provides indemnity to protect against damage or loss from an AI morphism recorded on the blockchain.

Methods of the disclosure may include recording an AI morphism of an AI entity to a distributed ledger each time a manufacturer releases a revision to the AI entity. Alternatively, or additionally, the method may include recording an AI morphism of an AI entity to a distributed ledger after the AI entity autonomously evolves certain types of functionality. An AI morphism may be recorded on a distributed ledger as, for example, a hash value derived from identifiable characteristics of a respective revision to an AI entity. The method may include executing one or more CHFs—such as, e.g., SHA-256—on identifiable characteristics of an AI morphism to yield a hash value.

Methods of the disclosure may include executing a smart contract to create, transfer, or destroy a fungible token. The fungible token may be, for example, an ERC-20 token on the Ethereum blockchain. The fungible token may be available for purchase or sale within an ecosystem of smart contracts to indemnify one or more AI morphisms of one or more AI entities. The fungible token may represent liability, rights, and/or available resources regarding indemnification of an AI morphism. For example, an indemnitor and a manufacturer may form a pool of fungible tokens that are accessible to pay any damage claims arising from an AI morphism. The quantity of a fungible token within a pool to indemnify an AI morphism may be based, at least in part, on the number of users that adopt the AI morphism.

Methods of the disclosure may include autonomous acquisition of a fungible token by an AI entity to support subsequent morphisms of the AI entity (e.g., the AI entity could support its own morphisms by purchasing fungible tokens to supports its offspring). The method may include requiring an AI entity to pass a Turing Test to authorize autonomous execution of a smart contract. The method may include preventing smart contract execution based on a Turing Test result.

Methods of the disclosure may include a executing a smart contract to create, transfer, analyze, or destroy a non-fungible token. The non-fungible token may represent, inter alia, one or more aspects of a smart contract to indemnify an AI morphism. The non-fungible token may include data such as, inter alia, one or more of the following: parties to a smart contract, insurance policy terms, public cryptographic key of a party, contact information of a party, etc. The non-fungible token may be, for example, an ERC-721 token on the Ethereum blockchain.

Methods of the disclosure may include executing an "Enhanced Turing Test" to distinguish AI from humans and bots. In other words, the Enhanced Turing Test may be configured such that only an AI can pass the test, humans and bots should not be able to pass. The method may include an Enhanced Turing Test that includes one or more of the following: (i) word problem comprehension; (ii) computational cost or complexity of significant figures; (iii) nesting a plurality of word problems (e.g., answer from a first word problem is an input to solve a second word problem, etc.); and (iv) time constraints (e.g., an AI will solve, but humans and bots will not). The method may include identifying AI using time-constrained nested mathematical word problems. The method may include measuring a response to simple math (e.g., a polynomial time-constrained problem), word problems (e.g., human readable and reduced to equation), and/or expensive math (e.g., excessive precision polynomial time constrained problem). The method may include deriving a relation/equation where AI performance is superior to, or otherwise readily distinguishable from, humans and bots. The method may include calculating a completion percentage of the time-constrained nested mathematical word problems and comparing the completion percentage to a predetermined threshold to identify AI performance. The method may include displaying a prompt configured to initiate the Enhanced Turing Test.

For example, a method of the disclosure provides a prompt to initiate an Enhanced Turing Test to distinguish between AI, bots, and humans. In response to initializing the Enhanced Turing Test, the method provides a plurality of nested Scholastic Assessment Test (SAT) word problems and a count-down timer for completion. The nested plurality of SAT word problems is nested such that solving a first word problem yields a first solution which is an input for a second word problem to yield a second solution which is an input for a third word problem to yield a third solution, etc. The method processes the response to the Enhanced Turing Test when a time limit set by the count-down timer is reached. The method analyzes the response to determine if an AI completed the Enhanced Turing Test.

In some embodiments, a method of the disclosure may include executing a smart contract to compare two or more AI entities on a blockchain. The smart contract may include analyzing distinctions between at least two morphisms of at least two AI entities. The method may include executing machine learning techniques to compare a morphism of a first AI entity to a plurality of morphisms of a plurality of AI entities on a blockchain. The method may include identifying a deviation in code or implementation of a given morphism of a first AI entity with respect to a plurality of morphisms of a plurality of AI entities.

Methods of the disclosure may include executing a CHF to yield a hash value of an AI morphism's source code and recording the hash value to a distributed ledger. The method may include allocating resources to a reserve pool so that an AI entity can autonomously support subsequent self-mutations by drawing from the reserve pool. The method may include reverting an AI entity to a previous version based, at least in part, on a hash value of the previous version source code recorded on a distributed ledger. The method may include transferring resources between a first pool and a second pool in response to reverting an AI entity to a previous version such that the previous version is active and indemnified by the second pool.

In some embodiments, a method of the disclosure includes recording AI morphisms to a blockchain. An AI entity may have a plurality of morphisms over a period. A morphism is recorded to a block of a permissioned ledger. The permissioned ledger 9 forms a distributed ledger, and may include a blockchain such as, e.g., the Ethereum blockchain.

In some embodiments, a method of the disclosure includes indemnifying an AI entity morphism. For example, a vehicle manufacture that develops an autonomous vehicle includes an AI entity to operate the autonomous vehicle. Source code of the AI operating the autonomous vehicle is recorded to a blockchain. An indemnitor may agree to indemnify the AI operating the autonomous vehicle through a smart contract executed on the blockchain. The indemnitor owes a contractual obligation to indemnify an indemnitee from liability arising from the AI's operation of the autonomous vehicle. Terms of the contractual obligation may be specified in the smart contract and available for inspection on the blockchain.

In some embodiments, a method of the disclosure includes indemnifying an AI entity morphism includes providing an AI entity with an enhanced Turing Test. The enhanced Turing Test may include a time-constrained nested word problem to distinguish AI from humans or bots. After identifying the AI entity as artificial intelligence based on results from the enhanced Turing Test, the AI entity is authorized to propagate and/or implement at least one morphism. The at least one morphism is recorded on a blockchain by the AI entity. A smart contract on the blockchain is executed by an indemnitor to indemnify an indemnitee from liability arising from implementation of the at least one morphism. The indemnitor may execute a smart contract using one or more digital tokens of value (e.g., ERC-20 token) to pay a claim.

For example, an indemnitor may execute a smart contract on a blockchain which provides that the indemnitor agrees to indemnify an AI entity configured to operate an autonomous vehicle. The indemnitor agrees to indemnify the AI entity and any morphisms of the AI entity that are recorded on the blockchain. The AI entity creates a morphism and records the morphism on the blockchain. The indemnitor executes a smart contract to indemnify the AI morphism after recording to the blockchain.

Referring now to FIG. 1, which illustrates an example flow diagram for implementing a method 100 for attesting to a system of interest on a blockchain according to embodiments of the disclosure. Step 102 (S102) of method 100 may include selecting one or more properties ("$P_K$") of a system of interest based on a respective system's digital form. The type and quantity of properties available for selection may vary between different systems of interest. $P_K$ may include, inter alia, one or more properties amenable to digital form—such as, e.g., a cryptographic hash 400A; Security Assertion Markup Language (SAML) 400B; Unified Modeling Language (UML) 400C; Hoare logic 400D; Gallina 400E; a labeled transition system 400F; etc. (See FIG. 4.) In some embodiments, one or more properties ($P_K$) of an SOI may be recorded on, and accessible by, a blockchain. Selecting $P_K$ in S102 may include accessing a blockchain, database, or other non-transitory computer-readable storage media to retrieve one or more $P_K$ of an SOI. Selecting $P_K$ in S102 may include providing a graphical user interface (GUI) or application program interface (API) to enable an entity to select one or more properties associated with one or more systems of interest. Selecting $P_K$ in S102 may be useful, for example, for evaluating the $P_K$ to make an attestation decision as discussed herein.

Step 104 (S104) of method 100 may include evaluating the selected $P_K$ in S102 to verify that a respective $P_K$ is associated with a respective SOI. Evaluating $P_K$ in S104 may include, for example, using one or more mathematical computations to verify authenticity of a respective $P_K$. For example, in some embodiments, evaluating $P_K$ in S104 may include using a cryptographic function to verify a cryptographic hash property of a given system of interest. In other embodiments, evaluating $P_K$ in S104 may include using Hoare logic with one or more Hoare Triples that may describe how execution of code in the SOI changes the state of computation to verify authenticity of the SOI. Evaluating $P_K$ may include one or more proofs evaluated according to a set of logical rules and compared to a set of known authentic values of a respective $P_K$. Evaluating $P_K$ in S104 may include cross-referencing one or more selected $P_K$ with a blockchain, database, or other non-transitory computer-readable storage media having an accurate value for the one or more selected $P_K$ stored thereon to verify authenticity.

After evaluating $P_K$ in S104, methods of the disclosure may include a decision in Step 106 (S106) on whether an entity will be attesting to a system of interest based on the evaluated $P_K$. Attesting to an SOI in S106 may include an assertion by an entity about whether the SOI does (or does not) have the evaluated $P_K$. Attesting may include an assertion verifying authenticity of an SOI, or one or more morphisms of an SOI, based on the evaluated $P_K$ in S104. In the case that $P_K$ cannot be verified (i.e., "no" at S106), then method 100 may either end or return to S102 to select $P_K$. In the case that $P_K$ can be verified (i.e., "yes" at S106), then method 100 proceeds to recording the attestation to a blockchain in Step 108 (S108). S108 may include recording a transaction on a blockchain describing the SOI, one or more $P_K$ of the SOI, transaction history on the blockchain, one or more parties involved in the transaction, or any other relevant information amenable to digital form that is associated with the SOI. The attestation may be an immutable recordation on a blockchain that is accessible to any entity granted access to the blockchain. For instance, methods according to the disclosure may include recording each evaluated $P_K$ (e.g., a cryptographic hash value) of the SOI to a blockchain (e.g., Ethereum blockchain) for a third-party to access. Recording the attestation may include recording a transaction to one or more blockchains based on the SOI, $P_K$, or existing contracts on the blockchain.

Figure 2:
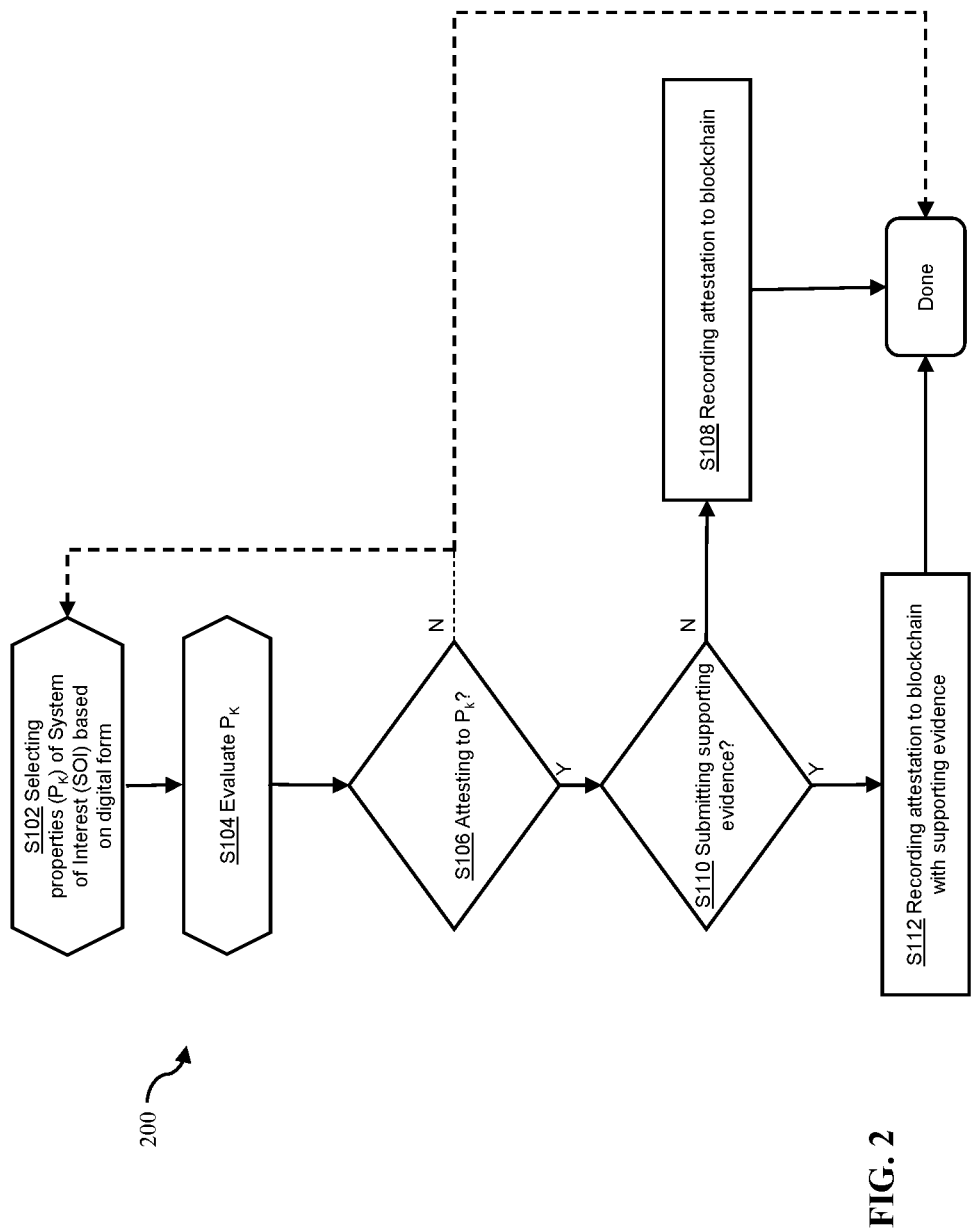
FIG. 2 shows an illustrative flow diagram for implementing a methodology to attest to a system of interest on a blockchain according to further implementations of the disclosure.

Turning now to FIG. 2, which illustrates another example flow diagram for implementing a method 200 for attesting to a system of interest on a blockchain according to the disclosure. Method 200 may include steps S102, S104, and S106 as discussed herein regarding the embodiment shown in FIG. 1, and aspects of those steps will not be reiterated for brevity. After determining whether to attest to the evaluated $P_K$ S106, method 200 may include a decision in Step 110 (S110) on submitting evidence to support an attestation. Supporting evidence may include mathematical calculations, $P_K$ evaluation methods, or other supporting documents amenable to digital form for recording on a blockchain to support an attestation. Supporting evidence may be provided by, for example, a graphical user interface (GUI) or other software program to provide one or more pieces of evidence for submission by an attestor. In the case that evidence is to be submitted (i.e., "yes" at S110), method 200 proceeds to Step 112 (S112) of recording the attestation to a blockchain with supporting evidence provided by the attestor. For instance, after deciding to attest to a cryptographic hash property of an SOI, an attestor submits a copy of the evaluation method by which it was determined that the SOI has the cryptographic hash property for recording on the blockchain. In the case that evidence is not to be submitted (i.e., "no" at S110), method 200 proceeds to S108 of recording the attestation to a blockchain as previously discussed herein regarding method 100 of FIG. 1.

Figure 3:
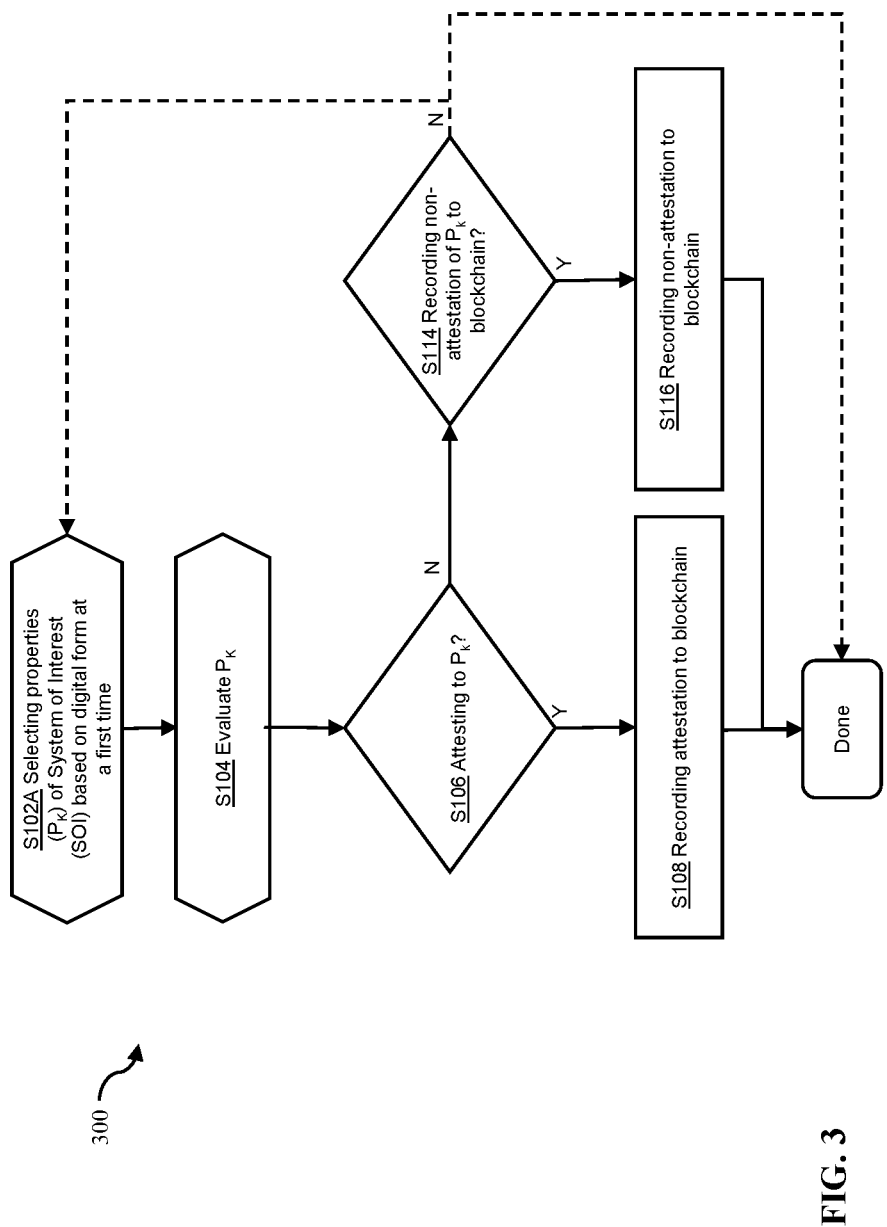
FIG. 3 shows an illustrative flow diagram for implementing a methodology to attest to a system of interest on a blockchain according to still further implementations of the disclosure.

Turning now to FIG. 3, which illustrates another example flow diagram for implementing a method 300 for attesting to a system of interest on a blockchain according to the disclosure. Method 300 includes steps S102, S104, S106, and S108 as discussed herein regarding the embodiments shown in FIGS. 1-2, and aspects of those steps will not be reiterated for brevity. Method 300 is distinguishable from FIG. 1 because in the case of not attesting to the SOI in S106, then method 300 proceeds to a decision in Step 114 (S114) on recording a non-attestation to the blockchain. Recording a non-attestation may include an assertion or other evidence that a respective SOI does not have one or more $P_K$ based on evaluation results in S104. Determining whether to record a non-attestation may include prompting an attestor (i.e., a human or machine user) to decide whether or not to record the non-attestation to a blockchain. If an attestor records a non-attestation (i.e., "yes" at 114), then method 300 proceeds to Step 116 (S116) of recording the non-attestation. S116 may include recording evidence on the blockchain supporting a non-attestation that the SOI does not have specified properties at a given time. For example, an attestor may record a non-attestation on a blockchain that a system of interest does not have an expected cryptographic hash value, and provide evidence of the verification process (e.g., an unexpected hash value output) to record to the blockchain. If an attestor does not record a non-attestation (i.e., "no" at 114), then method 300 either ends or begins again at S102.

Figure 4:
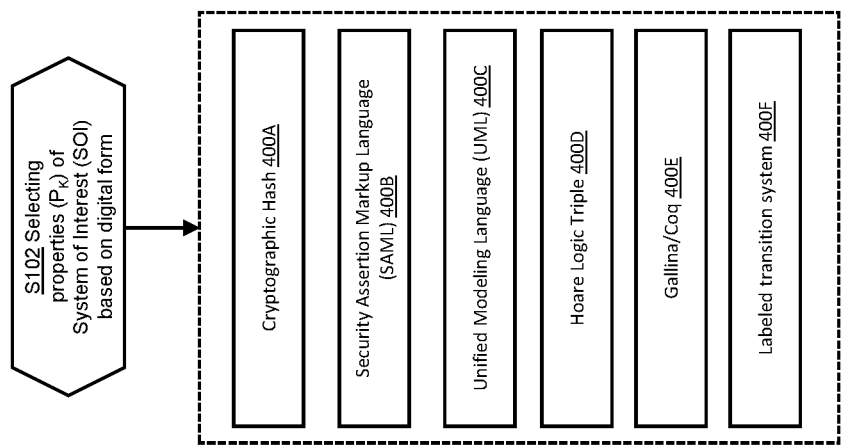
FIG. 4 shows a diagram for implementing a methodology for selecting a property of a system of interest for attestation according to the disclosure.
Figure 5:
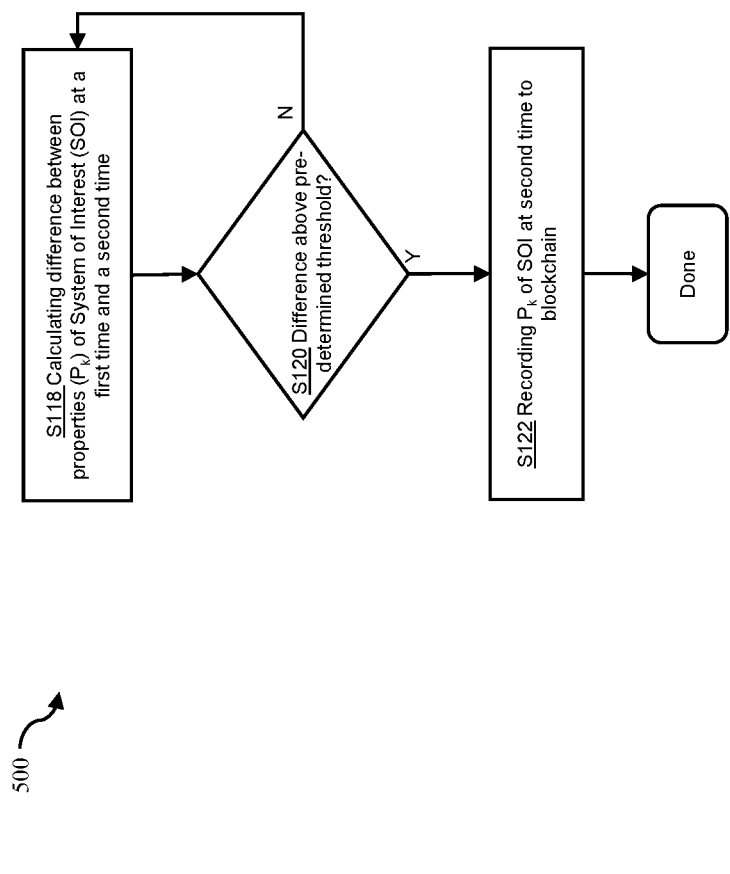
FIG. 5 shows an illustrative flow diagram for implementing methodology to attest to a system of interest on a blockchain according to further implementations of the disclosure.

Turning now to FIG. 5, which shows an illustrative flow diagram for implementing a method 500 for comparing properties of a system of interest at different points in time for recording changed property values to a blockchain according to further implementations of the disclosure. Method 500 may include Step 118 (S118) of calculating a difference between one or more $P_K$ of an SOI at a first time and one or more $P_K$ of the SOI at a second time. For example, calculating a difference between properties in S118 may include one or more of the properties 400A-400F (FIG. 4). The $P_K$ of the SOI at the first and second times may be accessed by a blockchain, API, or other digital means. After calculating a difference in S118, method 500 may proceed to a decision in Step 120 (S120) of determining whether the calculated difference in S118 is above a pre-determined threshold. The pre-determined threshold may be user defined at creation of an SOI or set by an indemnitor based on the type of SOI, indemnification requirements, or other criteria. The pre-determined threshold may determine if sufficient change to the SOI has occurred such that any change requires recording to a blockchain. In the case that the calculated difference is above the pre-determined threshold (i.e., "yes" at S120), method 500 proceeds to Step 122 (S122) of recording the SOI to the blockchain. This may include, for example, a cryptographic hash function output of a source code or other aspects of the SOI. In the case that the calculated difference is below the pre-determined threshold (i.e., "no" at S120), method 500 reverts to S120 for further calculations of differences exhibited by the SOI until the calculated difference is above the pre-determined threshold.

Figure 6:
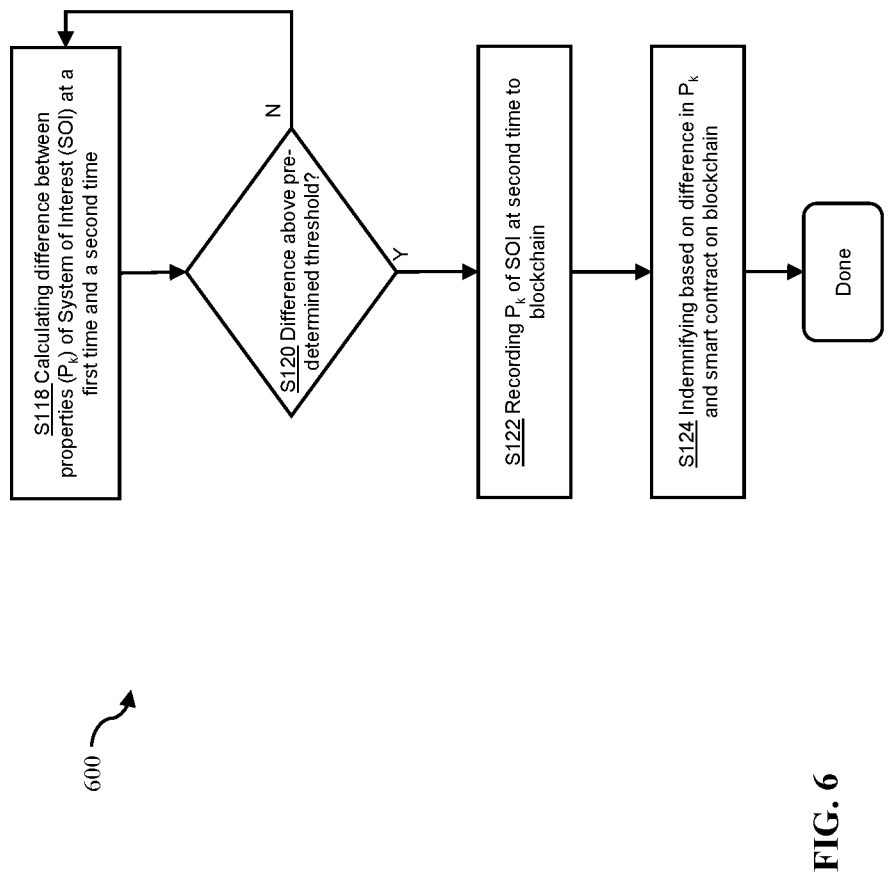
FIG. 6 shows an illustrative flow diagram for implementing a methodology to indemnify a system of interest according to the disclosure.

Turning now to FIG. 6, which shows an illustrative flow diagram for implementing a method 600 for comparing properties of a system of interest at different points in time for indemnification using a smart contract on a blockchain according to further implementations of the disclosure. Method 600 includes S118, S120, and S122 as discussed herein regarding method 500 (FIG. 5), and these steps will not be reiterated for brevity. Method 600 is distinguishable because it includes an indemnifying based on the different $P_K$ of an SOI and a smart contract in Step 124 (S124). Indemnifying in S124 may include indemnification of a third party that created, owns, or otherwise has rights to, a morphism of the SOI with $P_K$ at a second time. Indemnifying in S124 may include protecting an indemnitee against risk of loss from adverse events attributable to the morphism of the SOI. S124 may include executing a new smart contract or an existing smart contract on a blockchain. The smart contract may include acceptable conditions (e.g., calculated differences in $P_K$) and events that an indemnitor will indemnify the SOI. The smart contract may provide for one or more updates to the smart contract indemnifying the SOI at two or more points in time. The smart contract may be configured to autonomously detect a recorded change in one or more properties and autonomously act based on one or more terms of the smart contract. For example, the smart contract may specify that an indemnitee will not be liable for an autonomous vehicle accident if the artificial intelligence has an encoding variation greater than 10%, and automatically send updates to the blockchain and relevant parties when the encoding variation threshold is exceeded.

Figure 7:
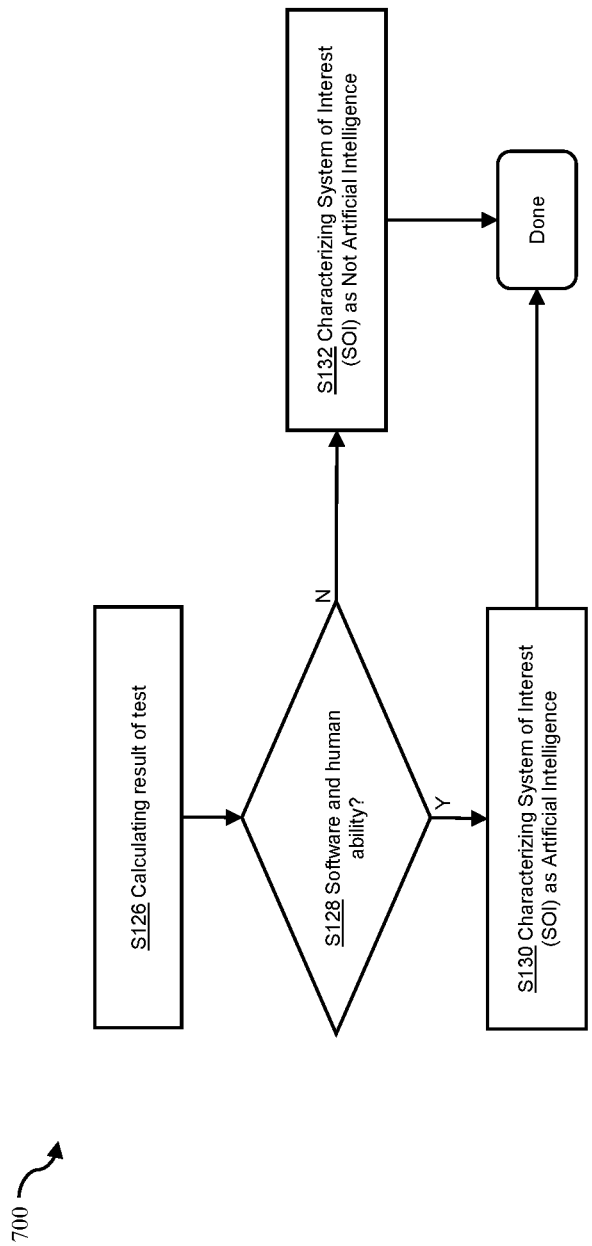
FIG. 7 shows an illustrative flow diagram for implementing a methodology to differentiate between artificial intelligence and non-artificial intelligence according to the disclosure.
Figure 12:
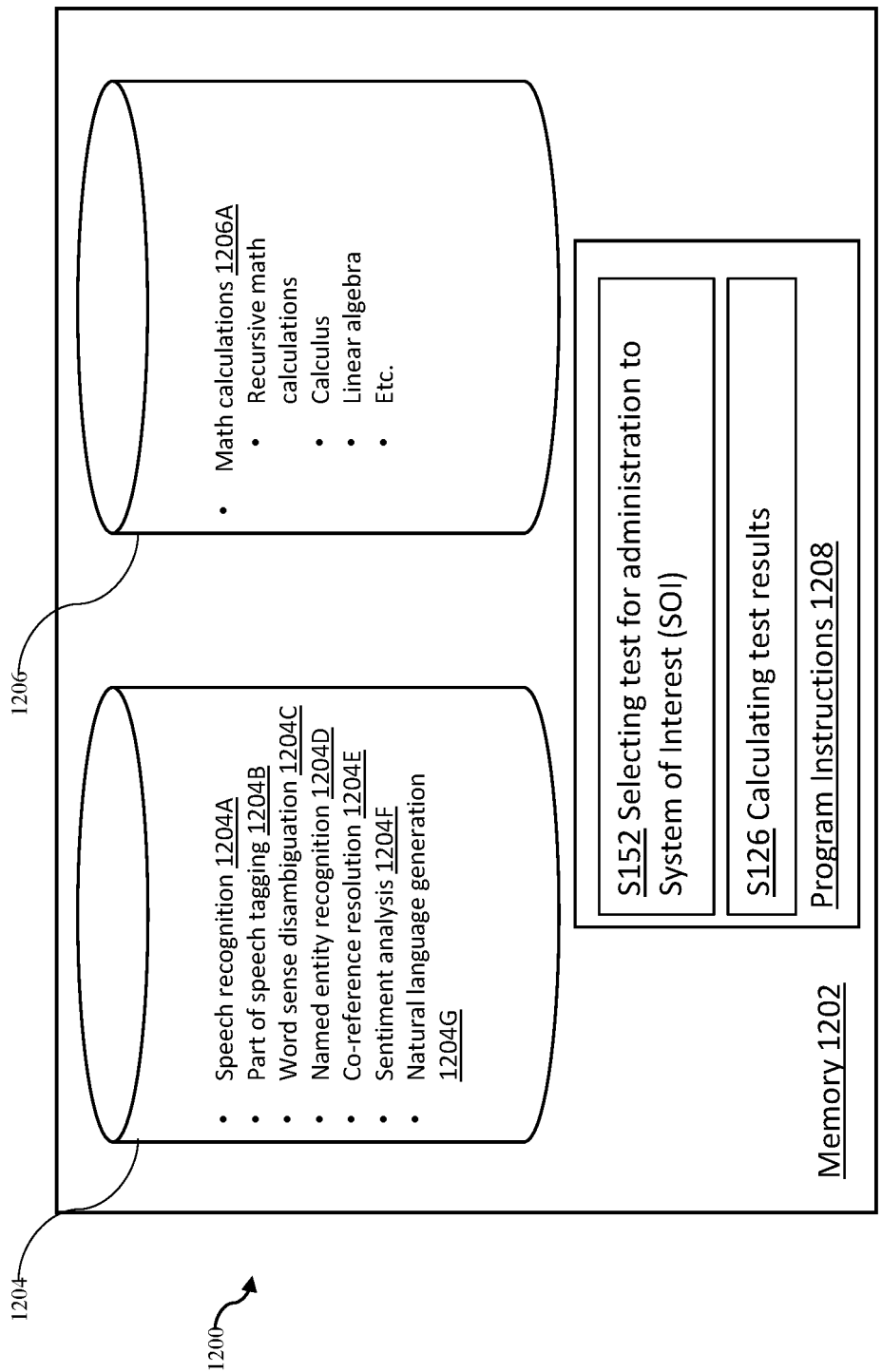
FIG. 12 shows a system diagram for implementing a methodology to differentiate between artificial intelligence and non-artificial intelligence according to the disclosure.

Turning now to FIG. 7, which illustrates an example flow diagram for implementing a method 700 to differentiate between artificial intelligence and non-artificial intelligence. Method 700 includes Step 126 (S126) of calculating results of one or more tests administered to a system of interest. Calculating results of tests in S126 may include evaluating whether an SOI passed or failed one or more tests configured to determine if the SOI has a human ability and/or a software ability. For example, S126 may include calculating results of an Enhanced Turing Test as discussed herein. FIG. 12 depicts a system 1200 configured to store one or more tests in a memory 1202 including a first database 1204 and a second database 1206. First database 1204 may include one or more human ability tests such as, e.g., speech recognition 1204A, part of speech tagging 1204B, word sense disambiguation 1204C, named entity recognition 1204D, co-reference resolution 1204E, sentiment analysis 1204F, and natural language generation 1204G. Second database 1206 may include one or more software ability tests such as mathematical calculations 1206A (e.g., recursive math calculations, calculus, linear algebra, etc.). The software ability test may evaluate response accuracy and/or duration of time required to complete one or more mathematical calculations 1206A. The software ability test may include one or more evaluation thresholds (e.g., an accuracy threshold, time threshold, etc.) to evaluate a response of the software ability test. For example, a response to a software ability test may indicate a test taker (e.g., system of interest) has a software ability when the response is accurate above an accuracy threshold and the duration of time is below a time threshold. In some embodiments, developing one or more software ability tests may include using a machine learning algorithm to analyze test response data from humans and software to teach the machine learning algorithm to classify future test takers (e.g., system of interest) as either having or not having a software ability. System 1200 may include one or more program instructions 1208 configured to execute one or more of the methods described herein. Program instructions 1208 may include, for example, software configured for executing the step of selecting a test for administration to a system of interest in S152, tests may be selected from first database 1204 and second database 1206. Program instructions 1208 may include, for example, software configured for executing the step of calculating test results in S126. Calculating test results S126 may be useful for determining whether a system of interest has artificial intelligence based on the presence or absence of human and software abilities in Step 128 (S128). In the case that the SOI has a software ability and a human ability (i.e., "yes" in S128), method 700 proceeds to characterizing the SOI as artificial intelligence in Step 130 (S130). In the case that the SOI does not have a software ability and a human ability (i.e., "no" in S128), method 700 proceeds to characterizing the SOI as non-artificial intelligence in Step 132 (S132). An SOI only having a human ability indicates that the SOI is human, and an SOI only having a software ability indicates the SOI is a non-artificial intelligence software program. Characterizing the SOI as having (or not having) artificial intelligence may be useful for subsequent processes discussed herein such as, e.g., subsequently executing one or more smart contracts on a blockchain.

Figure 8:
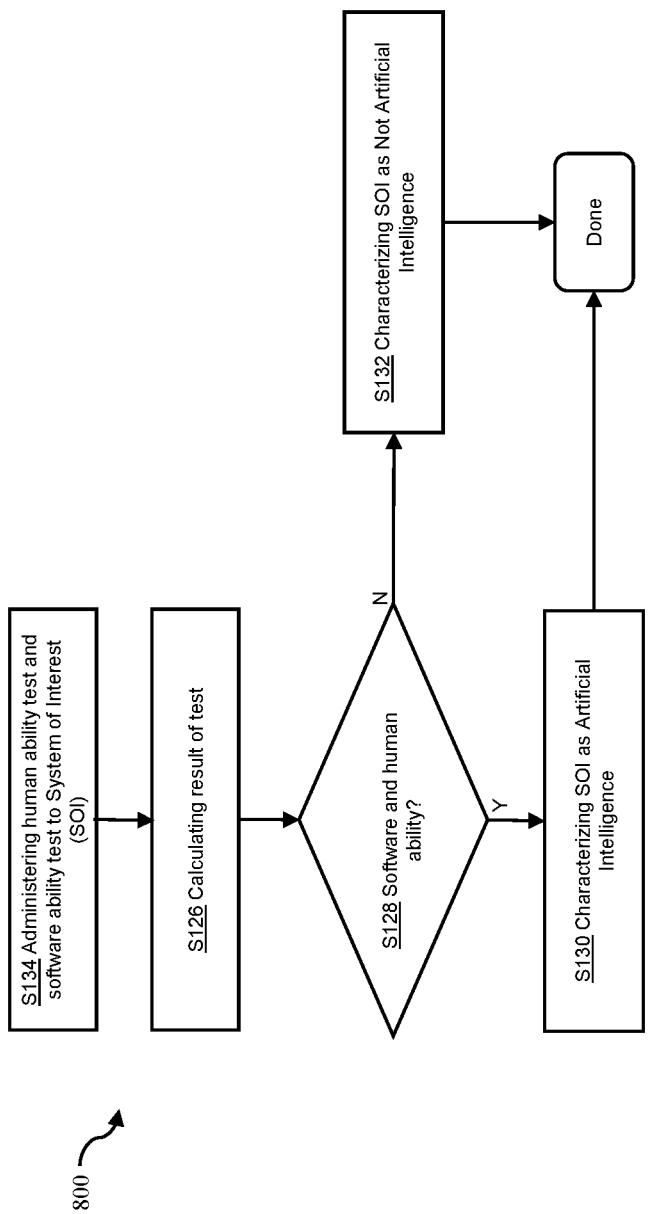
FIG. 8 shows an illustrative flow diagram for implementing the methodology of FIG. 7 according to the disclosure.

Turning now to FIG. 8, which illustrates an example flow diagram for implementing a method 800 to differentiate between artificial intelligence and non-artificial intelligence. Method 800 includes S126, S128, S130, and S132, and these steps will not be reiterated for brevity. Method 800 is distinguishable from method 700 (FIG. 7) at least because prior to calculating results of a test in S126, the method 800 further includes a Step 134 (S134) of administering a test (e.g., Enhanced Turing Test), the results of which will subsequently be calculated in S126 as previously discussed. Administering the test S134 may include providing a user interface, software application, web application, or other digital interface to provide one or more tests to an SOI to determine whether the SOI has artificial intelligence. The test in S134 may include a first test to detect the presence or absence of a human ability (e.g., language comprehension test), and a second test to detect the presence or absence of a software ability (e.g., mathematical computation test). The results of which are configured to classify an SOI as being one of a human, artificial intelligence, or non-artificial intelligence software.

Figure 9:
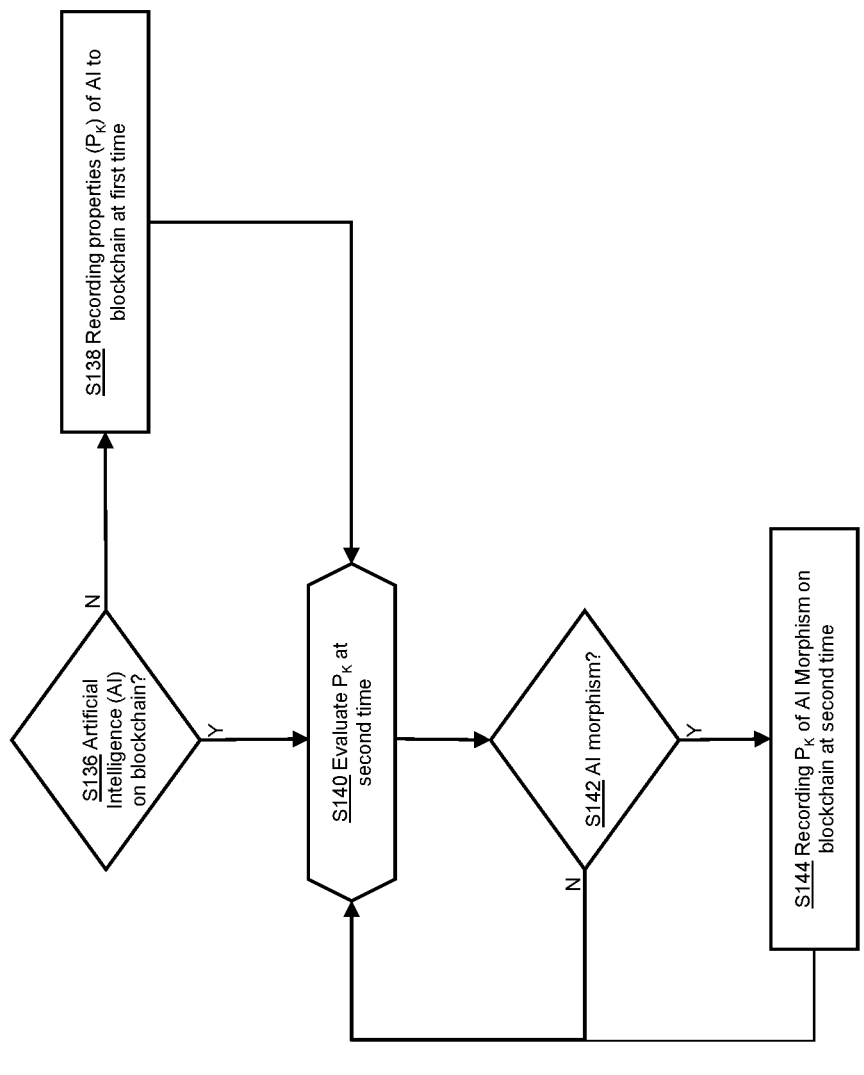
FIG. 9 shows an illustrative flow diagram for implementing a methodology to attest to a morphism of an artificial intelligence according to the disclosure.

Turning now to FIG. 9, which illustrates an example flow diagram for implementing a method 900 for attesting to a morphism of an SOI having artificial intelligence according to the disclosure. Method 900 may include determining whether the artificial intelligence is on a blockchain in Step 136 (S136). S136 may include programmatically accessing a blockchain to retrieve one or more $P_K$ of a respective SOI having artificial intelligence. In the case that the artificial intelligence has not been recorded to the blockchain (i.e., "no" at S136), then method 900 proceeds to recording properties of the artificial intelligence to the blockchain at a first time in Step 138 (S138). S138 may include recording an encoding of the AI at a first time to the blockchain. The encoding of the AI entity at the first time may include, for example, source code and learned information. Learned information may include, inter alia, one or more machine learning processes developed and/or implemented by the artificial intelligence. For example, learned information of an artificial intelligence may include a weighted neural network. In the case that the artificial intelligence has previously been recorded to the blockchain at a first time (i.e., "yes" at S136), then method 900 proceeds to evaluating properties $P_K$ of the artificial intelligence at a second time after the first time in Step 140 (S140). S140 may include one or more evaluation methods previously discussed herein (See e.g., FIGS. 1-6), and similar methodologies will not be reiterated in detail for brevity. After evaluating $P_K$ at the second time in S140, method 900 proceeds to determining whether the artificial intelligence having $P_K$ at the second time is a morphism of the artificial intelligence having $P_K$ at the first time in Step 142 (S142). For example, S142 may include comparing a first cryptographic hash value of the AI at the first time to a second cryptographic hash value of the AI at the second time. S142 may include determining whether a difference in $P_K$ between the first and second times are above or below a pre-determined threshold. The pre-determined threshold may indicate what degree of difference in $P_K$ is required to classify the artificial intelligence at the second time as a morphism. In the case that the artificial intelligence at the second time is not a morphism (i.e., "no" at S142), then method 900 may proceed back to S140 for evaluating the artificial intelligence at a subsequent time (e.g., a third time) to identify a morphism. Method 900 may further include a time delaying feature configured to avoid duplicative evaluations in S140 by preventing further evaluation of the artificial intelligence by a pre-determined time interval. In the case that the artificial intelligence at the second time is a morphism (i.e., "yes" at S142), then method 900 may proceed to recording one or more $P_K$ of the morphism to the blockchain in Step 144 (S144). Recording one or more $P_K$ in S144 may include substantially similar steps discussed herein for recording properties of an SOI to a blockchain (See, e.g., FIGS. 1-6), and these steps will not be reiterated in detail for brevity. Recording one or more $P_K$ in S144 may be useful to execute subsequent process such as, for example, a smart contract configured to indemnify against a risk of loss based on a change in one or more $P_K$ of the artificial intelligence. Method 900 may proceed back to S140 for further evaluations of the artificial intelligence at one or more subsequent times (e.g., a third time) to identify subsequent morphisms for recording to a blockchain. Method 900 may loop for a pre-determined timespan (e.g., duration of a smart contract), until a third party ends the process, or indefinitely.

Figure 10:
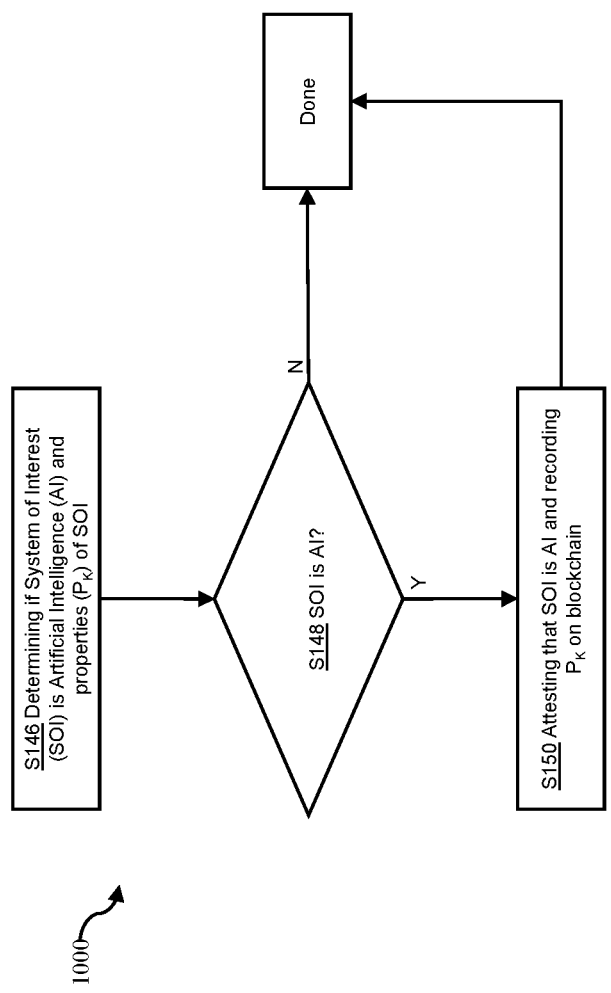
FIG. 10 shows an illustrative flow diagram for implementing another methodology to attest to a morphism of an artificial intelligence according to the disclosure.

Referring now to FIG. 10, which illustrates an example flow diagram for implementing a method 1000 for classifying a SOI as having artificial intelligence and attesting to the SOI on a blockchain according to the disclosure. Method 1000 may include two or more methods previously discussed herein such as, e.g., classifying an SOI has having artificial intelligence (FIGS. 7-8) and recording an attestation of the SOI on a blockchain (FIGS. 1-6). Method 1000 may include determining if a system of interest is artificial intelligence and determining one or more properties of the SOI. For example, S146 may include determining if an SOI is artificial intelligence using an Enhanced Turing Test (e.g., FIGS. 7-8). Method 1000 proceeds to determining whether the SOI is artificial intelligence in Step 148 (S148). In the case that the SOI is not artificial intelligence (i.e., "no" in S148), then method 1000 ends. In the case that the SOI is artificial intelligence (i.e., "no" in S148), then method 1000 proceeds to attesting that the SOI is artificial intelligence and recording the attestation to a blockchain in Step 150 (S150). S150 may include one or more of the attesting methods discussed elsewhere herein (e.g., FIGS. 1-4).

Figure 11:
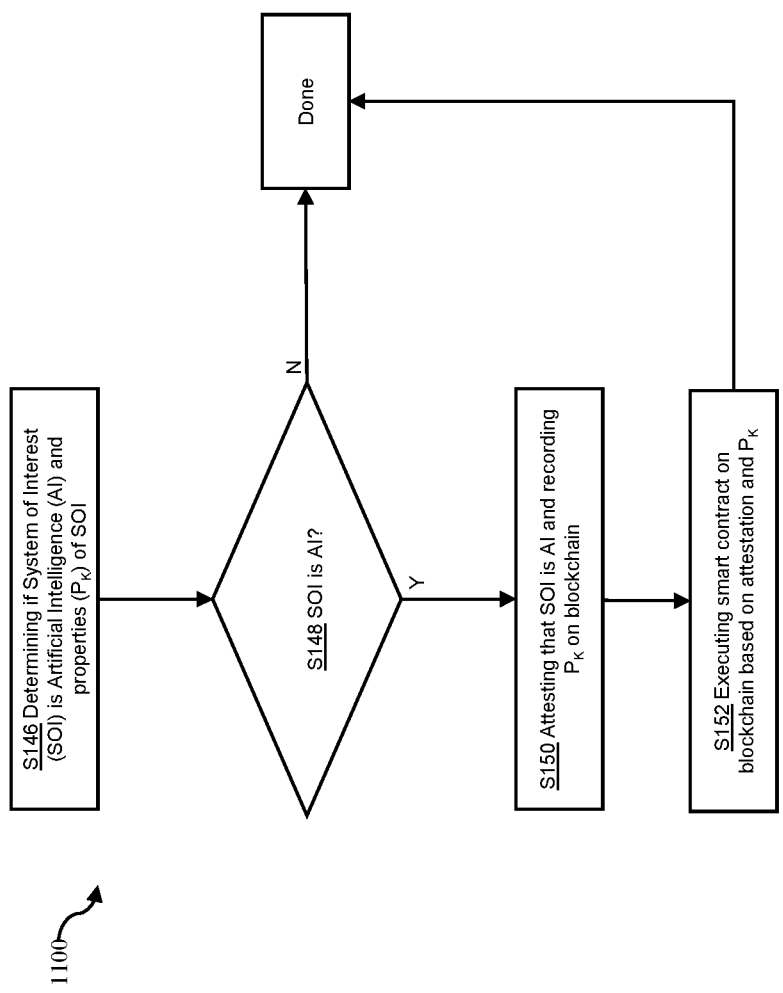
FIG. 11 shows an illustrative flow diagram for implementing a methodology to execute a smart contract based on an attestation according to the disclosure.

Referring now to FIG. 11, which illustrates an example flow diagram for implementing a method 1100 for classifying a SOI as having artificial intelligence, attesting to the SOI on a blockchain, and executing a smart contract in response to the attestation according to the disclosure. Method 1100 includes S146, S148, and S152 as discussed elsewhere herein (FIG. 10), and aspects of these steps will not be reiterated for brevity. After attesting to the SOI and recording $P_K$ of the SOI on the blockchain in S150, method 1100 proceeds to executing a smart contract on the blockchain in Step 152 (S152). Executing the smart contract in S152 may be based, at least in part, on the attestation and $P_K$ in S150. The smart contract may include pre-determined terms that indicate what actions (if any) are to be taken in response to various attestations and/or $P_K$. Executing the smart contract in S150 may include, for instance, indemnifying a third party associated with the SOI to mitigate a risk of loss from a property based on the $P_K$. For example, executing the smart contract in S150 may provide that an indemnitor will indemnify any action resulting from the SOI so long as the SOI has the same $P_K$ recorded to the blockchain in S150. In this example, any change of $P_K$ (e.g., a morphism of the SOI) recorded to the blockchain would invalidate the smart contract and the indemnitor will no longer be liable for an adverse event that occurs due the morphism.

Figure 13:
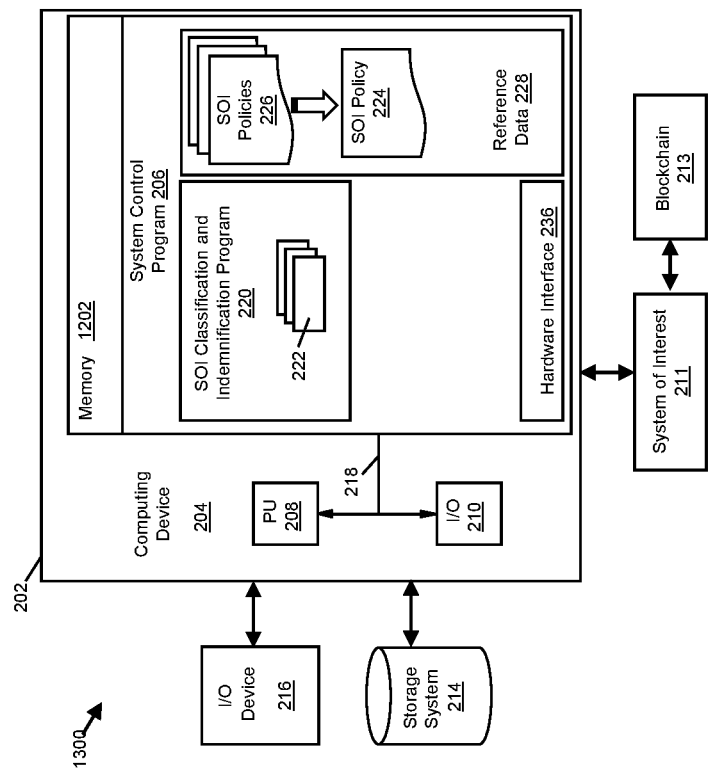
FIG. 13 shows a schematic diagram of an illustrative system for implementing operational methodologies according to embodiments of the disclosure.

Turning now to FIG. 13, an illustrative system 1300 for implementing the methods and/or systems described herein is shown. Controller 202 is shown as including a computing device 204. Computing device 204 can include, e.g., a system control program 206 which may include, e.g., one or more sub-systems (SOI classification and indemnification program 220 described herein) for performing any/all processes described herein and implementing any/all embodiments described herein.

Controller 202 is shown including a processing unit (PU) 208 (e.g., one or more processors), an I/O component 210, a memory 1202 (e.g., a storage hierarchy), an external storage system 214, an input/output (I/O) device 216 (e.g., one or more I/O interfaces and/or devices), and a communications pathway 218. In general, processing unit 208 can execute program code, such as system control program 206, which is at least partially fixed in memory 1202. While executing program code, processing unit 208 can process data, which can result in reading and/or writing data from/to memory 1202 and/or storage system 214. Pathway 218 provides a communications link between each of the components in system 1300. I/O component 210 can comprise one or more human I/O devices, which enable a human user to interact with controller 202 and/or one or more communications devices to enable a system user to communicate with the controller 202 using any type of communications link. To this extent, system control program 206 can manage a set of interfaces (e.g., graphical user interface(s), application program interface(s), etc.) that enable system users to interact with system control program 206. Further, system control program 206 can manage (e.g., store, retrieve, create, manipulate, organize, present, etc.) data, through several modules contained within SOI classification and indemnification program 220 (i.e., modules 222). SOI classification and indemnification program 220 is shown by example as being sub-systems of system control program 206. However, it is understood that SOI classification and indemnification program 220 may be wholly independent systems. Memory 1202 of computing device 204 is also shown to include a hardware interface 236 for translating outputs from system control program 206 into actions performed on a system of interest, morphisms of the system of interest, and interactions with the blockchain as discussed herein, though it is understood that hardware interface 236 may be included within one or more independent computing devices, programs, etc., in alternative embodiments.

As noted herein, system control program 206 can include SOI classification and indemnification program 220. In this case, various modules 222 of SOI classification and indemnification program 220 can enable controller 202 to perform a set of tasks used by system control program 206 and can be separately developed and/or implemented apart from other portions of system control program 206. Memory 1202 can thus include various software modules 222 of program 220 configured to perform different actions. Example modules can include, e.g., a comparator, a calculator, a determinator, etc. One or more modules 222 can use algorithm-based calculations, look up tables, software code, and/or similar tools stored in memory 1202 for processing, analyzing, and operating on data to perform their respective functions. Each module discussed herein can obtain and/or operate on data from exterior components, units, systems, etc., or from memory 1202 of computing device 204.

Sets of modules 222 of SOI classification and indemnification program 220 can perform functions of controller 202 in various implementations. SOI classification and indemnification program 220 can include, e.g., modules 222 for selecting an SOI policy 224 of a plurality of SOI policies 226 for system control program 206 to implement in system of interest 211. SOI policies 226 may include one or more conditions, terms, or other aspects required to execute the methods discussed herein (e.g., FIGS. 1-12) on system of interest 211. SOI policies 226 may use reference data 228 to create, modify, or exclude one or more of the SOI policy 225 stored therein. A selected SOI policy 224 may represent a specific method (e.g., one of the methods described in FIGS. 1-12) selected by modules 222 to implement on system of interest 211. For example, a selected SOI policy 224 may be configured to record system of interest 211 to a blockchain 213 specified by the SOI policy 224. Blockchain 213 may include one or more blockchains (e.g., distributed ledgers) that a respective system of interest 211 is configured to interact with defined by one or more of the SOI policies 226.

The various inputs that modules 222 may use for selecting SOI policy 224 can be provided to computing device 204, e.g., through I/O device 216. Some inputs concerning blockchain 213 can be converted into a data representation (e.g., a data matrix with several values corresponding to particular attributes) and stored electronically, e.g., within memory 1202 of computing device 204, storage system 214, and/or any other type of data cache in communication with computing device 204.

Controller 202 can be operatively connected to or otherwise in communication with system(s) of interest 211, as part of the SOI classification and indemnification program 220 for control of system(s) of interest 211. Controller 202 can thus be embodied as a unitary device electrically coupled to system(s) of interest 211 and/or other devices or can be multiple devices each operatively connected to form controller 202. As discussed herein, embodiments of the present disclosure thereby provide machine learning processes for control of system(s) of interest in response to various environmental and/or non-environmental inputs.

Where controller 202 comprises multiple computing devices, each computing device may have only a portion of system control program 206 and/or SOI classification and indemnification program 220 (e.g., one or more modules 222). However, it is understood that controller 202 and SOI classification and indemnification program 220 are only representative of various possible equivalent computer systems that may perform a process described herein. Controller 202 can obtain or provide data, such as data stored in memory 1202 or storage system 214, using any solution. For example, controller 202 can generate and/or be used to generate data from one or more data stores, receive data from another system, send data to another system, etc.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for classifying a system of interest (SOI) as human, artificial intelligence (AI), or non-AI software, the method comprising:
    administering an automated challenge to the SOI via a computing device, the automated challenge including:
        a first test configured to indicate whether the SOI has a human ability, and
        a second test configured to indicate whether the SOI has a software ability;
    calculating, based on the automated challenge and via the computing device, whether the SOI has the human ability and whether the SOI has the software ability; and
    based on the calculating, causing the computing device to characterize the SOI as a selected one of:
        human in response to the SOI having the human ability and not having the software ability,
        AI in response to the SOI having the human ability and the software ability, or
        non-AI software in response to the SOI not having the human ability and having the software ability.

2. The method of claim 1, wherein:
    administering the first test includes a language test not included in the second test; and
    administering the second test includes a math computation test not included in the first test.

3. The method of claim 1, wherein administering the first test comprises administering a Turing Test.

4. The method of claim 1, wherein administering the first test comprises one or more language tests, including: speech recognition, part of speech tagging, word sense disambiguation, named entity recognition, co-reference resolution, sentiment analysis, or natural language generation.

5. The method of claim 1, wherein administering the second test comprises one or more math computation tests, including: recursive math calculations, calculus, and linear algebra.

6. The method of claim 1, wherein administering the set of tests comprises:
    selecting the first test from a plurality of language tests;
    selecting the second test from a plurality of math computation tests; and
    displaying the first test and the second test on a graphical user interface (GUI) to the SOI.

7. A system for classifying a system of interest (SOI) as human, artificial intelligence (AI), or non-AI software, the system comprising:
    a memory; and
    a processor coupled to the memory and configured to perform actions including:
        administering an automated challenge to the SOI via a computing device, the automated challenge including:
            a first test configured to indicate whether the SOI has a human ability, and
            a second test configured to indicate whether the SOI has a software ability;
        calculating, based on the automated challenge and via the computing device,
        whether the SOI has the human ability and whether the SOI has the software ability ; and
        based on the calculating, causing the computing device to characterize the SOI as a selected one of:
            human in response to the SOI having the human ability and not having the software ability,
            AI in response to the SOI having the human ability and the software ability, or
            non-AI software in response to the SOI not having the human ability and having the software ability.

8. The system of claim 7, wherein:
    administering the first test comprises one or more language tests not included in the second test; and
    administering the second test comprises one or more math computation tests not included in the first test.

9. The system of claim 7, wherein administering the set of tests further comprises:
    selecting the first test from a plurality of language tests;
    selecting the second test from a plurality of math computation tests; and
    displaying the first test and the second test on a graphical user interface (GUI) to the SOI.

10. The system of claim 7, wherein administering the first test comprises administering a Turing Test.

11. The system of claim 7, wherein administering the first test includes one or more language tests, including: speech recognition, part of speech tagging, word sense disambiguation, named entity recognition, co-reference resolution, sentiment analysis, or natural language generation.

12. The system of claim 7, wherein administering the second test comprises one or more math computation tests, including: recursive math calculations, calculus, and linear algebra.

\* \* \* \* \*